Feb. 25, 1958 — J. STIRLING — 2,824,764
SLIDABLY ADJUSTABLE SUPPORT ASSEMBLY FOR CANOPIES, COVERS, AND THE LIKE
Filed July 6, 1956 — 2 Sheets-Sheet 1

INVENTOR.
JOHN STIRLING,
BY
McMorrow, Berman & Davidson
ATTORNEYS.

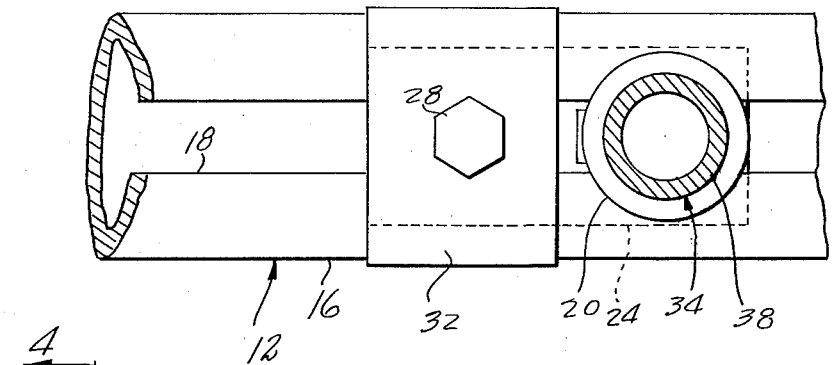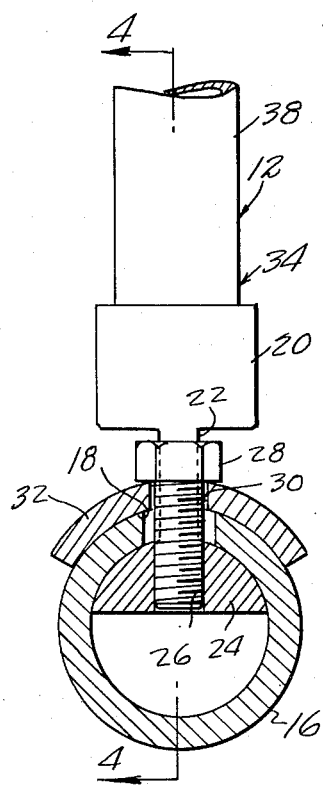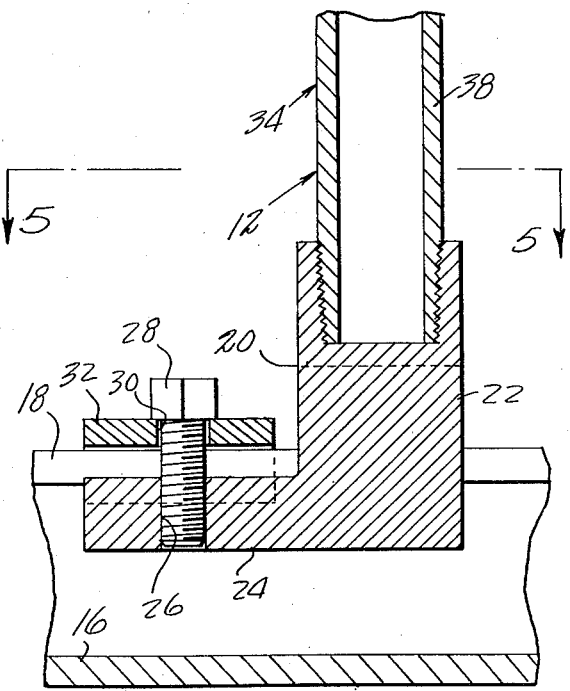

United States Patent Office 2,824,764
Patented Feb. 25, 1958

2,824,764

SLIDABLY ADJUSTABLE SUPPORT ASSEMBLY FOR CANOPIES, COVERS, AND THE LIKE

John Stirling, Klamath Falls, Oreg.

Application July 6, 1956, Serial No. 596,300

1 Claim. (Cl. 296—105)

In many instances, it is desired that a canopy or cover be extended over a particular area under some circumstances and removed or adjusted out of position in other instances. For example, open body trucks in many instances are used to carry loads that must be protected from the elements. Under these circumstances, a canopy or cover, either of hard or soft material, is desirable. In other instances, the same truck may be used under circumstances in which not only is it unnecessary to protect the load from the elements, but further, the existence of a canopy would prevent proper loading or unloading of the vehicle.

Still further, adjustable canopies or covers are desirable in other instances. For example, it may be desired that a marquee of a hotel, church, or other building be removed under some circumstances, and erected at other times. The same is true of funeral services, in which it is customary to extend a canopy over the burial place while funeral services are being held, with said canopy to be collapsed and removed when the services are completed. Still further, on boats one may desire or find the need for a canopy on certain occasions, as for example during stormy conditions.

The main object of the present invention is to provide a support for a canopy or cover, that will be designed to permit swift adjustment of the cover into and out of a covering position. While the invention has particular adaptability and is mainly intended for use on open body trucks, it has of course various other uses as heretofore indicated.

A more particular object is to provide a bracket means supporting a plurality of ribs of upwardly arched formation, which bracket means is slidably mounted in a pair of tracks extending along opposite sides of the area to be covered, the brackets being novelly designed in a manner to permit swift adjustment of the same to selected locations along the length of the track.

A further object of importance is to provide, in association with said bracket means, means for fixedly engaging the same with the associated track in any position to which the bracket means is adjusted, in a manner to prevent rattling, accidental looseness, etc.

A further object of importance is to provide a canopy support assembly as described so designed that the supporting ribs can be connected either to a rigidly constituted or to a flexible cover, whichever is desired. When connected to a rigid covering member, the support ribs are adapted for slidable adjustment within the tracks conjointly, as a single unit, so that the entire canopy structure can be removed bodily from the truck or other associated support, and subsequently returned to position with equal facility. When connected to a flexible covering, such as a canvas canopy, the support ribs are independently slidable within their associated tracks, so as to permit collapsing of the canopy at, for example, the inner end of the open truck body.

A further object of importance is to provide an assembly of the character stated that will be capable of manufacture at relatively low cost, will be adapted to be mounted with maximum speed and ease upon truck bodies and other supporting structures in a manner that will require a minimum of modification and redesign of said supporting structures, will permit swift adjustment of the canopy to protective and retracted positions respectively, and will be capable of assembly in any desired number or size, due to the manufacture of the device from a plurality of rib assemblies all identical to one another.

Other objects will appear from the following description, the claim appended thereto, and from the annexed drawing, in which like reference characters designate like parts throughout the several views, and wherein:

Figure 3 is an enlarged transverse section on line 3—3 of Figure 2, showing the bracket and track construction;

Figure 4 is a sectional view substantially on line 4—4 of Figure 3; and

Figure 5 is a plan sectional view substantially on line 5—5 of Figure 4.

Figure 1:
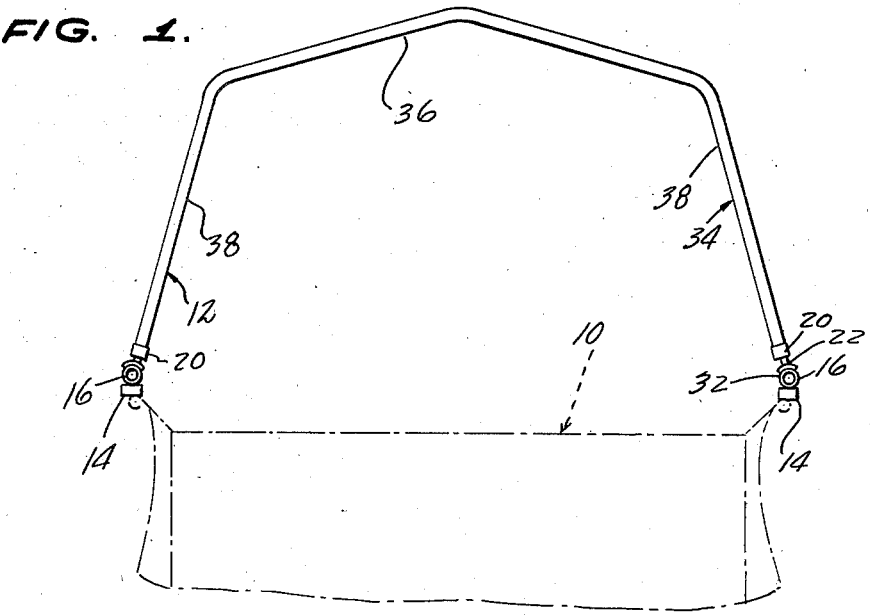
Figure 1 is a rear elevational view of a canopy support assembly or framing structure formed according to the present invention, a truck body being shown fragmentarily and in dotted lines.

Referring to the drawings in detail, the reference numeral 10 generally designates a conventional truck body, while at 12 there has been generally designated the support assembly constituting the present invention, adapted for supporting a canopy C.

Mounted upon the side walls of the truck body are elongated support bars 14, and fixedly secured to and overlying said support bars are elongated, straight, tubular tracks 16 adapted to extend the full length of the truck body and formed with longitudinal, upwardly opening guide slots 18 over their entire lengths.

Each bracket includes, in the illustrated example, an upwardly opening, tubular socket 20 integral at its lower end with a flat support plate 22 disposed in a vertical plane that lies diametrically of the socket 20. The support plate 22 at its lower end extends downwardly through the slot B, and is integral with one end of a horizontally extending inner clamp member 24 of half-round cross section. Adjacent the other end of the clamp member 24 there is formed therein a threaded opening 26, receiving a clamping or lock bolt 28, that extends through a smooth-walled opening 30 centrally formed in a transversely curved outer clamp member 32 seated saddle-fashion upon the track 16.

Due to this arrangement, at one end of the elongated inner clamp member 24 there is provided a socket means, while at the other end there is provided the means 28, adapted to cause the inner clamping member and the outer clamp member to be drawn toward each other into engagement with the outer and inner surfaces of the track 16 in selected positions to which the bracket is adjusted.

In the upper end of the socket 20, there is formed a threaded recess, opening upwardly to receive the complementarily threaded end of a canopy support rib generally designated at 34. The rib 34 may be of any desired shape, but will generally be of approximately inverted U-shape as shown in Figure 1, including a transversely disposed cross member or bight portion 36 merging at its opposite ends into depending legs 38, the lower ends of the legs having threads engaging in the sockets of transversely aligned brackets.

It will be understood that two brackets would be associated with each support rib, to provide a support rib means freely adjustable longitudinally of the respective tracks, and lockably engageable with the tracks in selected positions of adjustment, by turning the screw 28 home against the top surface of the outer clamping plate and shifting the inner and outer clamped members into binding engagement against the tracks.

Figure 2:
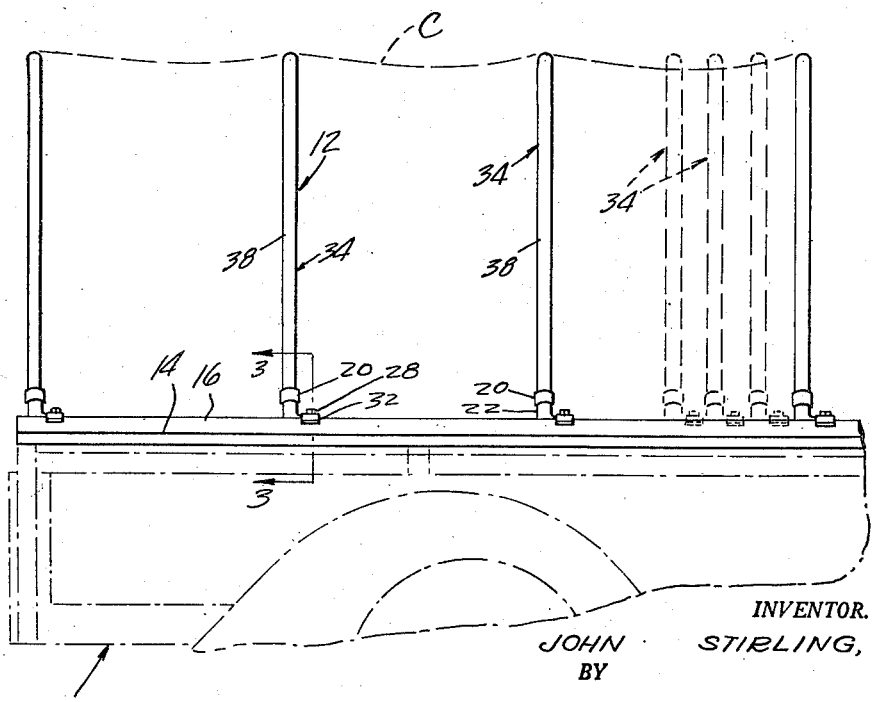
Figure 2 is a side elevational view of said assembly and truck body as seen from the right of Figure 1.

Thus, one can assemble any desired number of support rib assemblies, according to the length and size of the canopy C. The canopy in Figure 2 is of a flexible material, such as canvas, and is initially stitched or otherwise secured to the support rib at selected locations along the length of the canopy. Thus, when the canopy is to be disposed in covering relation to the bed of the truck, the brackets are all loosened, and the support ribs are shifted outwardly from one another to their full line positions of Figure 2, to extend the canopy. Then, the several screws 28 are tightened, to lock the support ribs in the selected positions of adjustment.

If is it desired to collapse the canopy, the screws 28 are all loosened, and the support ribs are slidably adjusted along the length of the tracks 16 until they are all in closely spaced relation, usually at the front ends of the tracks as shown in Figure 2 in dotted lines. This causes the canopy to be folded accordion-fashion, to expose the load-supporting area of the truck.

It will be understood that the support rib assemblies can also be connected to a rigid canopy C, such as a canopy formed of sheet metal or other hard material. In this instance, there would result a wholly rigid canopy structure, with all the support ribs permanently maintained in a selected, spaced relation to one another. In this instance, the entire canopy is bodily removable from the tracks, by loosening the screws 28 and shifting the entire canopy out of the track. The canopy can be reapplied with equal ease, by extension of the several brackets into the tracks and slidable adjustment of the entire canopy into its use position.

It will be readily perceived that the device is usable not only on open truck bodies, but can also be used to support the canopies of hotels, restaurants, etc. Further, the device can be used on boats or in any other situation in which the collapsible or removable canopy is desired. In every instance, the support rib assemblies can be used in any selected number and in any normal spacing desired, and the construction is such that it is not necessary to modify said support rib assemblies in any way, since they can be manufactured in one form, and can be usable for supporting canopies varying in length. One might, for example, construct the brackets all identical to one another, and permit the support ribs to be manufactured in different sizes or shapes, capable of assembly with the identically formed brackets. This reduces considerably the cost of manufacture, since the same brackets can be assembled with any of a large variety of support ribs.

It will further be understood that the support ribs need not necessarily be threaded at their opposite ends, but could be welded or otherwise permanently fastened to the brackets.

Still further, while the support ribs in the illustrated example are tubular formation, there is little limit to the materials that could be employed for this purpose. For example, flat steel, angle-iron material, or any of various other types of bar stock may be conveniently used.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A canopy support for a truck body comprising elongated, straight, parallel, tubular tracks adapted to be fixedly mounted on the respective side walls of said body and formed with longitudinal, upwardly opening, guide slots; a plurality of brackets carried by each track, each bracket including an upwardly opening, tubular, internally threaded socket and a flat support plate rigid with the lower end of said socket and lying in a vertical plane disposed diametrically of the socket, said plate having a lower end extending downwardly through the guide slot of the adjacent track, an elongated inner clamp member extending longitudinally within the track and rigidly connected at one end to the lower end of the plate, said member having adjacent its other end a threaded opening, the slot, plate, and said opening being aligned longitudinally of the track, an outer clamp member overlying the track and said other end of the inner member adjacent the plate, the outer clamp member having an opening registered with the threaded opening, and a clamping bolt threadedly engaged in said opening of the guide member and extending through the opening of said outer clamp member, the bolt including a head overlying the outer clamp member for clampably engaging the track wall between said members; and a plurality of ribs each of approximately inverted U-shape, said ribs extending transversely between the tracks with each rib including legs engaged threadedly in corresponding sockets of brackets carried by the respective tracks.

References Cited in the file of this patent

UNITED STATES PATENTS

| | | |
|---|---|---|
| 1,863,957 | Woolcott | June 21, 1932 |
| 2,068,041 | Tate | Jan. 19, 1937 |

FOREIGN PATENTS

| | | |
|---|---|---|
| 18,136 | Great Britain | Aug. 23, 1898 |